US006028126A

United States Patent [19]

Wang et al.

[11] Patent Number: 6,028,126

[45] Date of Patent: Feb. 22, 2000

[54] INK FOLLOWER COMPOSITIONS

[75] Inventors: Aiying Wang; Barry W. Chadwick, both of Simpsonville, S.C.; Jeffrey Banning, Wilsonville, Oreg.

[73] Assignee: Bic Corporation, Milford, Conn.

[21] Appl. No.: 09/167,503

[22] Filed: Oct. 7, 1998

Related U.S. Application Data

[62] Division of application No. 08/685,993, Jul. 25, 1996, Pat. No. 5,874,488.

[51] Int. Cl.[7] .................. C09D 11/00

[52] U.S. Cl. .................. 523/160; 523/161

[58] Field of Search .................. 523/161, 160

[56] References Cited

U.S. PATENT DOCUMENTS

| | | | |
|---|---|---|---|
| 2,615,857 | 10/1952 | Clarke | 524/490 |
| 2,627,938 | 2/1953 | Frohmader et al. | 524/585 |
| 2,678,634 | 5/1954 | Henriksen | 401/142 |
| 3,084,089 | 4/1963 | Morgan et al. | 524/481 |
| 3,424,537 | 1/1969 | Henriksen | 401/142 |
| 3,526,522 | 9/1970 | Seregely | 524/481 |
| 3,656,857 | 4/1972 | Seregely | 401/142 |
| 3,698,825 | 10/1972 | Sears et al. | 401/217 |
| 3,822,949 | 7/1974 | Dick | 401/217 |
| 3,875,105 | 4/1975 | Daugherty et al. | 523/161 |
| 4,077,772 | 3/1978 | Kramer et al. | 401/217 |
| 4,108,559 | 8/1978 | Dick et al. | 401/217 |
| 4,410,643 | 10/1983 | Muller | 523/161 |
| 4,475,950 | 10/1984 | Finlayson | 106/20 R |
| 4,536,099 | 8/1985 | Kiricoples et al. | 401/217 |
| 4,634,305 | 1/1987 | Herrnring | 401/151 |
| 4,671,691 | 6/1987 | Case et al. | 106/20 R |
| 4,686,246 | 8/1987 | Gajria | 523/161 |
| 4,708,506 | 11/1987 | Herrnring | 401/151 |
| 4,721,739 | 1/1988 | Brenneman et al. | 523/161 |
| 4,726,845 | 2/1988 | Thompson et al. | 106/25 A |
| 4,786,198 | 11/1988 | Zgambo | 401/142 |
| 4,789,399 | 12/1988 | Williams et al. | 106/20 R |
| 4,911,571 | 3/1990 | Inoue et al. | 401/202 |
| 4,971,628 | 11/1990 | Loftin | 106/20 R |
| 5,013,361 | 5/1991 | Case et al. | 106/20 R |
| 5,048,992 | 9/1991 | Loftin | 401/209 |
| 5,222,824 | 6/1993 | Nicoll et al. | 401/235 |
| 5,249,875 | 10/1993 | Hori et al. | 401/148 |
| 5,332,326 | 7/1994 | Hori | 401/148 |
| 5,338,793 | 8/1994 | Loftin | 523/160 |
| 5,348,989 | 9/1994 | Shiraishi | 523/160 |
| 5,466,281 | 11/1995 | Hanke et al. | 523/161 |

FOREIGN PATENT DOCUMENTS

| | | |
|---|---|---|
| 06200235 | 7/1994 | Japan . |
| 2099448 | 12/1982 | United Kingdom . |
| 2281257 | 3/1995 | United Kingdom . |
| 8604345 | 7/1986 | WIPO . |

OTHER PUBLICATIONS

CRC, Handbook of Lubrication, Theory and Practice of Tribology, vol. II, E. Richard Booser, 1984, pp. 255–267.

*Primary Examiner*—James J. Seidleck
*Assistant Examiner*—Olga Asinovsky
*Attorney, Agent, or Firm*—Abelman, Frayne & Schwab

[57] ABSTRACT

Ink follower compositions include a non-polar liquid that is a mixture of high molecular weight polybutene and low molecular weight polybutene, the high molecular weight polybutene having a number average molecular weight greater than about 900 and the low molecular weight polybutene having a number average molecular weight of about 500, the ratio of high molecular weight polybutene to low molecular weight polybutene being at least 2:1; a thickener and a polar additive. The polar additive is water or a non-ionic surfactant, e.g., ethoxylated nonylphenol.

9 Claims, No Drawings

INK FOLLOWER COMPOSITIONS

This application is a division of application Ser. No. 08/685,993 filed Jul. 25, 1996, now U.S. Pat. No. 5,874,488.

BACKGROUND

1. Technical Field

This disclosure relates generally to ink follower compositions for use in writing instruments; e.g., ball point pens. More specifically, this disclosure relates to novel ink follower compositions containing polar additives, thickener and/or specific combinations of non-polar fluid components.

2. Background of Related Art

Ink followers, also known as "grease plugs" are generally employed in ball-point pens containing inks of low viscosity. Typically, ink followers are composed of a liquid which is thickened to a grease-like consistency via the use of a thickener. The ink follower is positioned in the ink tube behind the ink supply at the opposite end from the ball point. The ink follower thereby prevents backleakage of the ink. Ink followers, in addition to preventing backleakage, also inhibit evaporation of solvents and reduce the risk of shock breakage (i.e., the formation of air gaps in the ink tube).

U.S. Pat. Nos. 3,526,522 and 3,656,857 disclose ink follower compositions containing a liquid vehicle and solid, microscopic grains or particles of organic plastic or polymer. U.S. Pat. No. 5,348,989 discloses ink volatilization-preventing compositions that contain a slightly volatile organic liquid, a gelling agent and a polyether-modified silicone.

It would be desirable to provide an ink follower composition that does not adhere too much to the walls of the ink tube on following and that reduces the risk of shock breakage within the ink reservoir.

SUMMARY

This disclosure relates to the present ink follower compositions include a non-polar liquid, a thickener and a polar additive. The polar additive is preferably selected from the group consisting of non-ionic surfactants, e.g., ethoxylated nonylphenols, and low molecular weight alcohols.

The polar additive component of the present ink follower compositions performs a dual function: promoting affinity between the ink follower and the ink which it follows (many inks are water-based and therefore possess a high degree of polarity) and minimizing the tendency of the ink follower to adhere to the walls of the ink tube as it travels down the ink tube. Therefore, the polar additive enhances the performance of the present ink follower compositions.

In another aspect, ink follower compositions are described including a non-polar liquid containing a mixture of high and low molecular weight polybutenes in a ratio of at least 2:1. In yet another aspect, this disclosure relates to ink follower compositions including a non-polar liquid containing a mixture of polybutene and mineral oil to provide a desired balance of properties.

DETAILED DESCRIPTION OF PREFERRED EMBODIMENTS

The ink follower compositions described herein include a non-polar liquid, a thickener and, in some instances, a polar additive.

Examples of non-polar liquids which can be used in the present compositions include mineral oils, animal and vegetable oils, esters, high-boiling hydrocarbons, higher fatty acids, higher alcohols and low-molecular weight polyolefins. Typical examples include vaseline, spindle oil, castor oil, olive oil, liquid paraffin and polybutene having an average molecular weight of 300–3000. The amount of the non-polar liquid to be used is in the range of from about 40 to about 90% by weight, preferably from 90 to 97% by weight with respect to the weight of the composition.

In particularly useful compositions, combinations of high molecular weight and low molecular weight polybutenes are used as the non-polar liquid component. By high molecular weight polybutene it is meant polybutene having a number average molecular weight greater than about 900. A suitable high molecular weight polybutene is available under the designation "H-100" from Amoco Inc. A suitable low molecular weight polybutane is available under the designation "L-100" from Amoco Inc. The ratio of high molecular weight should be at least 2:1. Where a polar additive (as described hereinafter) is not employed, the ratio of high molecular weight polybutene to low molecular weight polybutene should be at least 3:1. Alone, the individual polybutenes used to make the mixture might be too fluid or too waxy. In the-above-described ratios however, it has been discovered that the mixture of high and low molecular weight polybutenes provide ink follower compositions that exhibit desired flow characteristics.

In another aspect, compositions described herein include polybutene mixed with mineral oil as the non-polar liquid. The polybutene alone can be somewhat tacky and may adhere to the ink tube. However, it has now been discovered that a mixture of polybutene and mineral oil provides a good, grease-like consistency while avoiding undesirable adherence of the ink follower composition to the ink tube. In a particularly useful composition mineral oil is used in combination with the mixture of polybutenes.

Examples of thickeners which can be used in the present compositions include microparticle silica, metallic soaps such as magnesium stearate, calcium stearate, aluminum stearate and zinc stearate, inorganic pigments such as bentonite and carbon black, and organic pigments. The amount of the thickener to be used in the range of from 0.1 to 15% by weight, preferably from 2 to 10% by weight.

The third component which is preferably included in the present ink follower compositions is an additive with high polarity. Suitable polar additives include non-ionic surfactants and low molecular weight alcohols.

When a non-ionic surfact is chosen as the polar additive, consideration should be given to the compatibility of the surfactant with the non-polar liquid(s) in the composition and to the temperatures to be used in processing the ink follower. Thus, for example, where aluminum stearate is used as the thickener, temperatures up to 180° C. may be required during processing. Where clay thickeners are used, processing at room temperature is possible. Ethoxylated nonylphenols are particularly useful non-ionic surfactants in that they are compatible with a wide variety of non-polar liquids and can withstand a wide range of processing temperatures. One example of a suitable non-ionic surfactants is available under the designation Igepal RC-52 from Rhone Poulenc, Inc., Cranbury, N.J.

Low molecular weight hydroxyl-containing compounds can also be used as the polar additive in the present compositions. Suitable compounds include those of the formula R-OH wherein R is hydrogen or $C_1$ to $C_5$ alkyl. The choice of hydroxyl-containing compound will depend in some cases on the thickener employed. Thus, for example, where certain clays are used as the thickeners, water can serve as the polar additive. Ethanol and isopropanol are useful with a wide variety of thickeners and are the preferred polar additive.

Other, optional ingredients may also be incorporated into the present ink follower compositions. By way of example, a silicone oil or silicone wax can be added to the present compositions.

The compositions described herein can be prepared by adding the thickener and any polar additive or other ingredients to the non-polar liquid and mixing or kneading to provide a homogeneous mixture. Heating can be used to facilitate mixing when desired or necessary. The resulting compositions normally have a grease-like consistency.

EXAMPLES

The following examples are presented to illustrate specific embodiments of the present compositions. These examples should not be interpreted as limitations upon the scope of the invention.

Example 1

An ink follower of the following composition is prepared:

| | Weight Percent |
|---|---|
| Polybutene | 47.7 |
| Mineral Oil | 47.7 |
| Bentone 34 (Clay) | 2.8 |
| Ethanol (95% solution) | 1.8% |

Example 2

An ink follower of the following composition is prepared.

| | Weight Percent |
|---|---|
| Polybutene | 97.6 |
| Fumed Silica | 2.3 |
| Ethoxylated Nonylphenol | 0.1 |

Examples 3–6

The ink follower compositions listed in Table I are prepared using a mixture of high and low molecular weight polybutenes and aluminum stearate as the thickener. All values given in this and other examples are weight percent.

TABLE I

| Ingredient | Ex. 3 | Ex. 4 | Ex. 5 | Ex.6 |
|---|---|---|---|---|
| Polybutene H-100 | 81.14 | 70.92 | 60.75 | 61.12 |
| Polybutene L-100 | 15.50 | 19.84 | 29.98 | 29.98 |
| Aluminum Stearate 22* | 3.36 | 6.35 | 6.84 | 6.74 |
| Aluminum Stearate 30* | — | 2.90 | 2.28 | 2.00 |
| Ethoxylated Nonylphenol | — | — | 0.15 | 0.15 |
| Ratio of H/100-L/100 | 5.1/1.0 | 3.6/1.0 | 2.0/1.0 | 2.0/1.0 |

*Witco Inc., Akron, Ohio.

In preparing the compositions of Examples 3–6, the polybutene and aluminum stearate are heated to a temperature sufficient to melt the aluminum stearate and thereby ensure good mixing. Upon cooling, each of the formulations presented in Table I have a good, grease-like texture.

Examples 7–11

Table II presents further examples of ink follower compositions containing mixtures of polybutenes in accordance with this disclosure.

TABLE II

| | Ex. 7 | Ex. 8 | Ex. 9 | Ex. 11 | Ex. 12 |
|---|---|---|---|---|---|
| Polybutene H-100 | 81.14 | 66.91 | 77.89 | 79.59 | 80.20 |
| Polybutene L-100 | 15.50 | 13.13 | 13.06 | 14.50 | 15.04 |
| Aluminum Stearate 22 | 3.36 | 3.29 | 4.02 | 4.00 | 4.01 |
| Mineral Oil | — | 16.67 | — | — | — |
| Silicone Oil | — | — | 5.03 | — | 0.50 |
| Atlas G-711* | — | — | — | 2.0 | — |
| Ethoxylated Nonylphenol | — | — | — | — | 0.25 |

*Alkyl acryl sulfonate amine salt available from ICI Ame. Inc., Wilmington, DE.

Examples 12 and 13

Ink follower compositions containing polybutene and mineral oil (but no polar additive) are prepared having the following formulations:

| | Ex 12 | Ex. 13 |
|---|---|---|
| Polybutene H-100 | 40.66 | 35.94 |
| Aluminum Stearate 22 | 3.37 | 3.37 |
| Mineral Oil | 54.91 | 60.69 |
| Silicone Wax | 1.06 | — |

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. An ink follower composition for use with ball-point pen ink, said ink follower composition comprising:

a non-polar liquid, the non-polar liquid including a mixture of high molecular weight polybutene and low molecular weight polybutene, the high molecular weight polybutene having a number average molecular weight greater than about 900 and the low molecular weight polybutene having a number average molecular weight of about 500, the ratio of high molecular weight polybutene to low molecular weight polybutene being at least 2:1; and a thickener.

2. The ink follower composition of claim 1 which further comprises a polar additive selected from the group consisting of non-ionic surfactants and water.

3. The ink follower composition of claim 2 containing from about 40 to about 98 weight percent of the non-polar liquid from about 0.1 to about 10 weight percent of the thickener and from about 0.01 to about 5 weight percent of the polar additive.

4. The ink follower composition of claim 2 wherein the thickener is a metal soap.

5. The ink follower composition of claim 3 wherein the non-ionic surfactant is ethoxylated nonylphenol.

6. An ink follower composition for use in conjunction with ball-point pen ink in an ink tube, said ink follower composition comprising:

a non-polar liquid, the non-polar liquid including a mixture of high molecular weight polybutene and low molecular weight polybutene, the high molecular weight polybutene having a number average molecular weight greater than about 900 and the low molecular weight polybutene having a number average molecular weight of about 500, the ratio of high molecular weight polybutene to low molecular weight polybutene being at least 2:1;

a thickener; and a polar additive, the polar additive being a non-ionic surfactant.

7. The ink follower composition of claim 6 wherein the thickener is a metal soap.

8. The ink follower composition of claim 6 which contains from about 40 to about 98 weight percent of the non-polar liquid, from about 0.1 to about 10 weight percent of the thickener and from about 0.01 to about 5 weight percent of the polar additive.

9. The ink follower composition of claim 6 wherein the polar additive is an ethoxylated nonylphenol.

* * * * *